April 12, 1938.  R. M. SMITH  2,113,776
TANK CLOSURE
Filed July 27, 1935   2 Sheets-Sheet 2
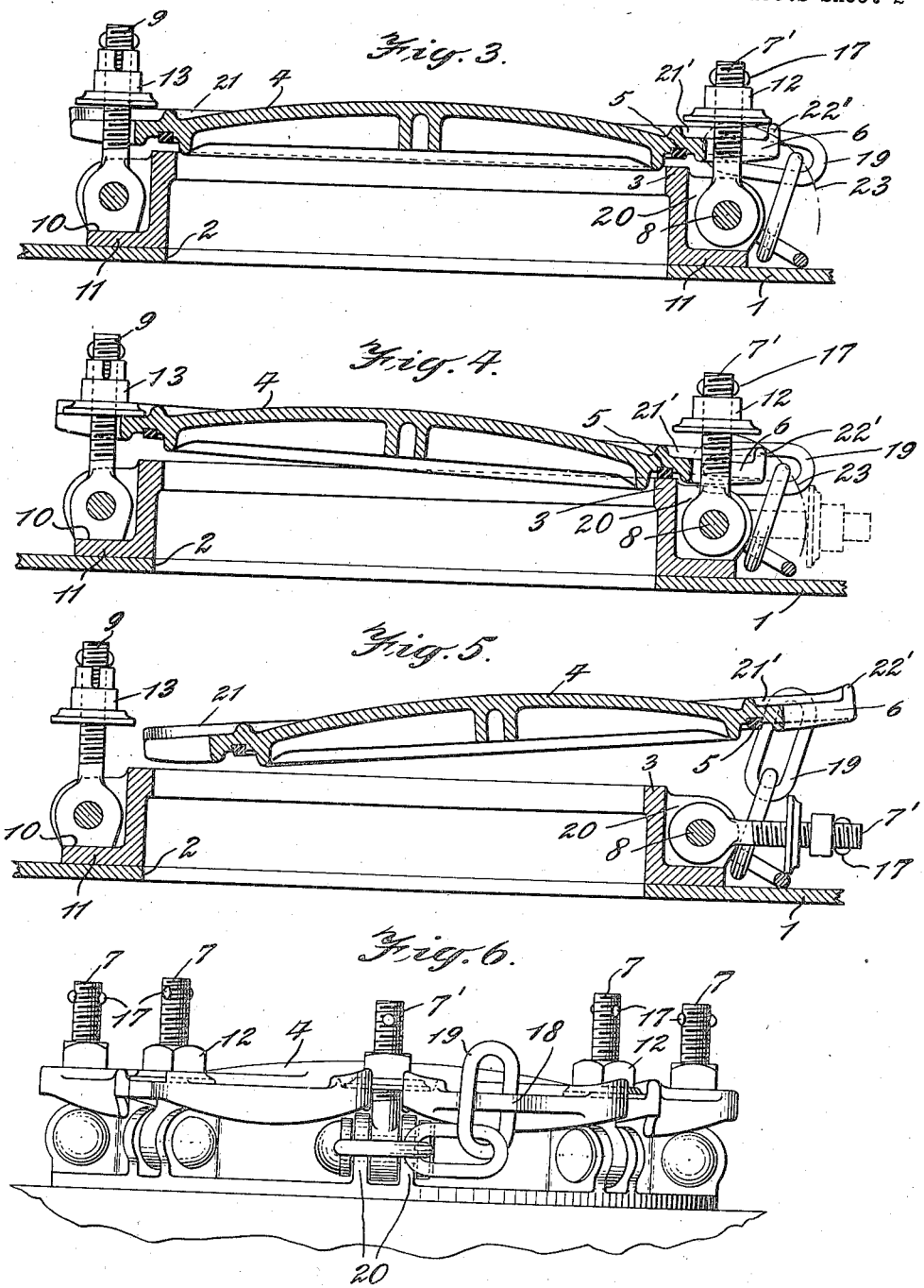
INVENTOR.
Ray M. Smith
BY
Gifford, Scull & Burgess
ATTORNEYS.

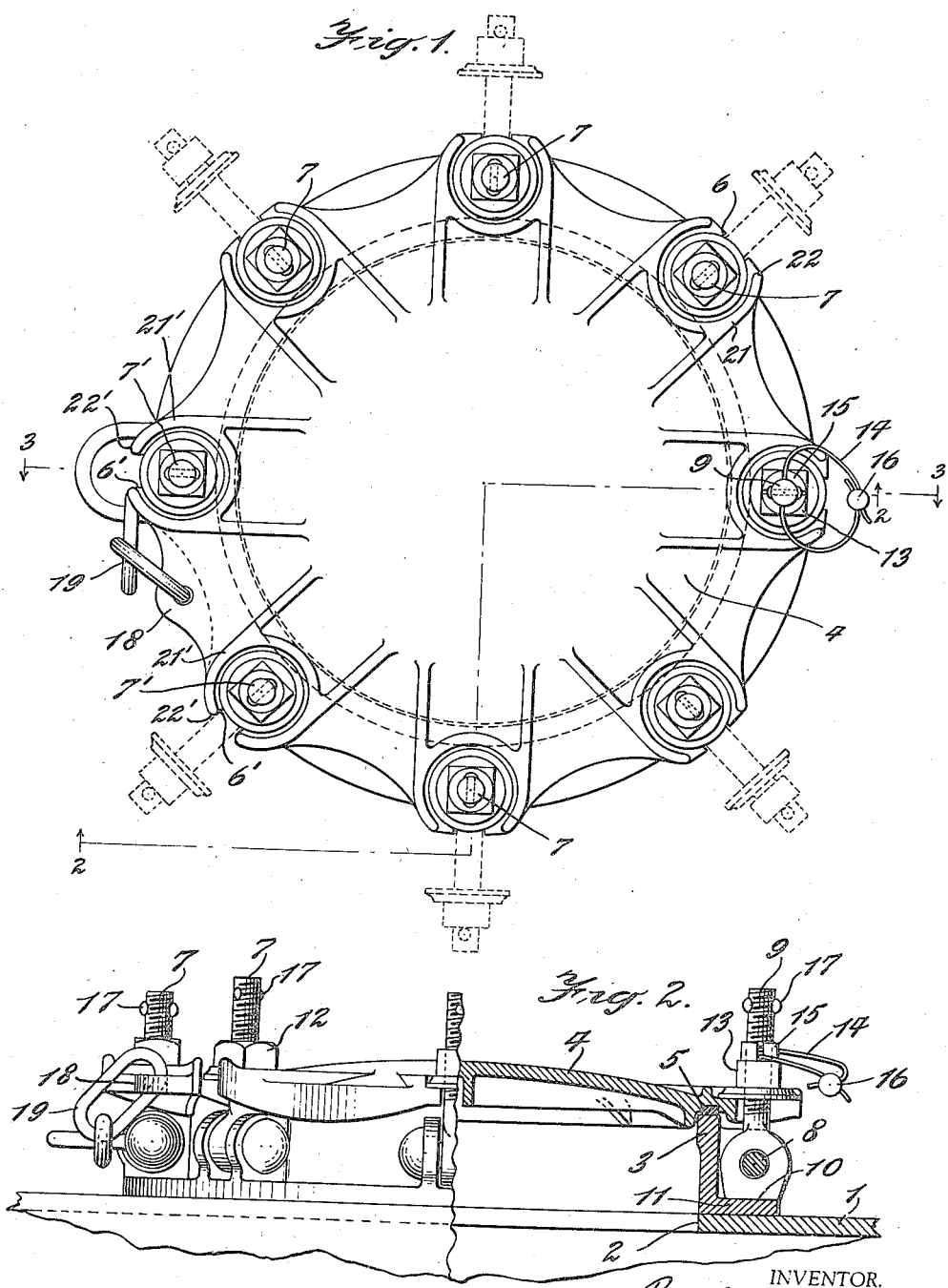

Patented Apr. 12, 1938

2,113,776

UNITED STATES PATENT OFFICE 2,113,776

TANK CLOSURE

Ray M. Smith, Evanston, Ill., assignor to Union Tank Car Company, Chicago, Ill., a corporation of New Jersey Application July 27, 1935, Serial No. 33,473

7 Claims. (Cl. 220—55)

This invention relates to a novel and improved form of tank closure, more particularly to a closure for a pressure tank, the novel features of which will be best understood from the following description and the annexed drawings, in which I have shown a selected embodiment of the invention and in which:

Fig. 1 is a plan view of a closure constructed according to the invention;

Fig. 2 is a view approximately on the line 2—2 of Fig. 1 showing the cover clamped in position;

Fig. 3 is a section approximately on the line 3—3 of Fig. 1 showing the cover raised from its seat;

Figs. 4 and 5 are views taken on the same plane as Fig. 3, but showing the cover and other parts in different positions; and Fig. 6 is an elevation of the closure as viewed from the left of Fig. 1.

The invention finds particular utility in connection with a tank which is subjected to internal pressure, and is designed primarily to prevent removal of the cover until the pressure has been released.

The numeral 1 designates the wall of a tank, which may, for example, be the upper part of a tank car for the transportation of material, such as gasoline, which will generate a vapor, and which in turn will create a pressure tending to blow off the cover upon releasing of the holding means. The wall 1 is shown as having an opening 2 therein surrounded by a seat 3, against which seat the cover rests. The cover 4 is provided with any suitable or usual bearing, here shown as a gasket 5.

The cover 4 is shown as having a plurality of slots 6 extending inwardly from the peripheral edge of the cover, and these slots are adapted to receive bolts bearing nuts which may be screwed down on the bolts against the top of the cover, to thus clamp the bearing against the seat.

In the illustrated embodiment, I have shown eight bolts, and of these eight I have shown seven bolts, designated by the numeral 7, as of the same construction, each being provided with a pivot 8 which is supported upon the tank so that the bolt may be swung outwardly from the cover. The eight bolt, designated 9, is preferably made stationary on the tank. For convenience, this result may be achieved by making the bolt 9 of the same general form as the bolts 7 and by making the bottom 10 thereof flat so as to engage against a fixed part on the tank, here shown as a horizontally extending leg 11 of an angle iron, the other leg of which forms the seat 3.

The nuts 12 on the various bolts 7 are all shown as of identical construction, while the nut 13 on the bolt 9 is preferably made of the castellated form shown so that, when it is clamped down against the cover as shown in Figs. 1 and 2, a sealing wire 14 may pass through a hole in the bolt and through the spaces between the castellations 15 and may be then secured by an ordinary seal 16. In all cases, the nuts are preferably prevented from being backed off the bolts as by retaining rivets 17.

Preferably, the bolt 9 is disposed approximately opposite to one of the bolts 7 which, for the sake of convenience, will be referred to as bolt 7'. The bolts 7' and 9 may also be referred to respectively as the hinge bolt and the seal bolt. Adjacent the hinge bolt, the cover is provided with an ear 18 having a hole receiving one link of a chain 19, another link of which passes through ears 20 on the tank so that, even though all other connecting means between the cover and the tank are ineffective, the chain will prevent removal of the cover from the tank.

Partially surrounding the various slots 6 are upwardly extending projections 21, the ends 22 of which are so placed as not to interfere with the outward swinging of the bolts 7 when the nuts 12 are raised to their uppermost positions. However, the projections 21' associated with two slots 6' on opposite sides of the ear 18 have a greater circumferential extent so that their ends 22' will interfere with the outward swinging of the bolt 7' in that particular slot, for a purpose which will appear presently.

In operation, the cover 4 will normally close the opening 2 as shown in Fig. 2, the various nuts engaging the top of the cover to clamp the bearing against the seat. The first step in removing the cover is to remove the seal and then loosen all nuts as much as can be done before they engage the rivets 17. If there is sufficient pressure in the tank to lift the cover, it may be lifted to some such position as shown in Fig. 3, wherein it will be seen that the cover is held against removal by the nuts and is also held against sidewise movement by engagement of the nuts on the bolts with the projections 21.

Now all of the bolts 7 may be swung outwardly to the position shown in dotted lines in Fig. 1, the only bolts then remaining upright being the bolts 7' and 9. The bolt 7' cannot be swung outwardly, however, until the cover 4 has been tilted by being raised on the stationary bolt 9 to some such position as that indicated in Fig. 4. The clearance line of the nut 12 is indicated by the dot and dash lines 23 in Figs. 3 and 4, and it will be seen that by the tilting of the cover to the position shown in Fig. 4, this clearance line will clear the end 22' of the projection 21'.

Tilting of the cover as indicated in Fig. 4 will serve to release any pressure which there may be in the tank, even though that pressure has not for any reason lifted the cover as indicated in Fig. 3. For example, if the cover were sealed or cemented to its seat by some sealing compound, it might be that the pressure in the tank would not be enough to break this seal formed by that compound, but nevertheless, if the seal were broken by lifting the cover, there might be enough pressure to blow the cover off if some means were not provided to prevent that happening. Accordingly, the tilting of the cover as shown in Fig. 4 serves as a safety venting of the tank to release any pressure which there may be in the tank.

The bolt 7' may now be swung outwardly and downwardly to the position shown in dotted lines in Fig. 4 and in full lines in Fig. 5, and then the cover may be moved freely on the flexible hinge formed by the chain 19 to slide the cover out of engagement with the stationary bolt 9. When putting the cover on the tank, the above steps may be reversed, applying the cover first to the stationary bolt 9, it being noted that since the ear 18 is approximately midway between the two slots 6', either one of these slots may be used to engage the bolt 7', and the chain hinge will insure that the hinge bolt 7' will be placed in one of these two slots 6'.

By the above arrangement, it will be seen that I have provided means for locking a clamping device and cover together until the cover has been raised to release any pressure which there may be in the tank. The two bolts 7' and 9 positively prevent removal of the cover, and the projection end 22' provides a locking means which prevents releasing of the cover until the pressure has been released as shown in Fig. 4.

While I have shown the invention as embodied in a specific form, it is to be understood that various changes in details may be made without departing from the scope of the invention, as defined in the appended claims.

I claim:

1. A closure for an opening in a pressure tank comprising a seat surrounding said opening, a cover having a bearing adapted to contact with said seat to close the opening, a plurality of bolts spaced around the cover and adapted to clamp said bearing against said seat, two of said bolts being disposed approximately opposite each other and the others being readily disengageable from the cover, one of said two bolts being rigid with respect to the seat and the other being mounted to move outwardly from the cover, and means preventing said outward movement until said cover has been slightly raised to release pressure in the tank.

2. A closure for an opening in a pressure tank comprising a seat surrounding said opening, a cover having a bearing adapted to contact with said seat to close the opening, a plurality of bolts spaced around the cover within the peripheral edge thereof and normally extending upwardly from the tank through slots in the cover extending inwardly from said edge, nuts on said bolts above said cover to clamp said bearing against said seat, one of said bolts being stationary and the others being pivoted on the tank to swing outwardly from the cover, and means preventing such swinging of at least one of said pivoted bolts until the cover has been slightly raised to release pressure in the tank.

3. A closure for an opening in a pressure tank comprising a seat surrounding said opening, a cover having a bearing adapted to contact with said seat to close the opening, a plurality of bolts spaced around the cover within the peripheral edge thereof and normally extending upwardly from the tank through slots in the cover extending inwardly from said edge, nuts on said bolts above said cover to clamp said bearing against said seat, two of said bolts being disposed approximately opposite each other, means preventing removal of said nuts from said two bolts, one of said two bolts being stationary and the other being pivoted on the tank to swing outwardly from the cover, and a projection on the cover adapted to engage the nut on said other bolt to prevent such swinging until the cover is slightly raised on the stationary bolt to release pressure in the tank.

4. A closure for an opening in a pressure tank comprising a seat surrounding said opening, a cover having a bearing adapted to contact with said seat to close the opening, a plurality of bolts spaced around the cover within the peripheral edge thereof and normally extending upwardly from the tank through slots in the cover extending inwardly from said edge, nuts on said bolts above said cover to clamp said bearing against said seat, two of said bolts being disposed approximately opposite each other, means preventing removal of said nuts from said two bolts, one of said two bolts being stationary and the other being pivoted on the tank to swing outwardly from the cover, and a projection on the cover adapted to engage the nut on said other bolt to prevent such swinging until the cover is slightly raised on the stationary bolt to release pressure in the tank, the cover then being freely movable inwardly away from said stationary bolt.

5. A closure for an opening in a pressure tank comprising a seat surrounding said opening, a cover having a bearing adapted to contact with said seat to close the opening, a plurality of bolts spaced around the cover within the peripheral edge thereof and normally extending upwardly from the tank through slots in the cover extending inwardly from said edge, nuts on said bolts above said cover to clamp said bearing against said seat, a chain loosely connecting the cover to the tank adjacent the edge of the cover and adjacent one of said slots, the bolt in said slot being pivoted on the tank to swing outwardly from the cover, a projection near said edge adjacent that slot and adapted to engage the nut on the bolt therein to prevent outward swinging thereof, and a stationary bolt adapted to enter a slot approximately opposite that slot.

6. A closure for an opening in a tank, comprising a cover having a plurality of slots spaced around the peripheral edge thereof and extending inwardly from said edge, bolts pivoted beneath said cover and received in said slots and having nuts disposed above said cover, means preventing removal of said nuts from their bolts, two adjacent slots having projections adjacent thereto and normally preventing outward movement of the bolt in said slot, a flexible connection between said tank and cover and secured to the cover between said two slots, whereby either one of said two slots may be caused to receive a certain bolt, and a stationary bolt disposed approximately opposite said certain bolt.

7. A closure for an opening in a pressure tank comprising a seat surrounding said opening, a cover having a bearing adapted to contact with said seat to close the opening, a plurality of bolts spaced around the cover within the peripheral edge thereof and normally extending upwardly from the tank through slots in the cover extending inwardly from said edge, nuts on said bolts above said cover to clamp said bearing against said seat, means preventing removal of one of said nuts from its bolt, said bolt being pivoted on the tank to swing outwardly from the cover, and a projection near said edge adjacent the slot receiving said pivoted bolt and adapted to engage the nut on said bolt in its uppermost position, thereby to prevent outward swinging of said bolt, tipping of said cover on said seat adjacent said bolt by a slight raising of the cover opposite said bolt lowering said projection sufficiently to permit such outward swinging of said bolt.

RAY M. SMITH.